Sept. 5, 1967  S. E. SACKS  3,339,288
PROJECTION GAME DEVICE
Filed Dec. 21, 1964  2 Sheets-Sheet 2
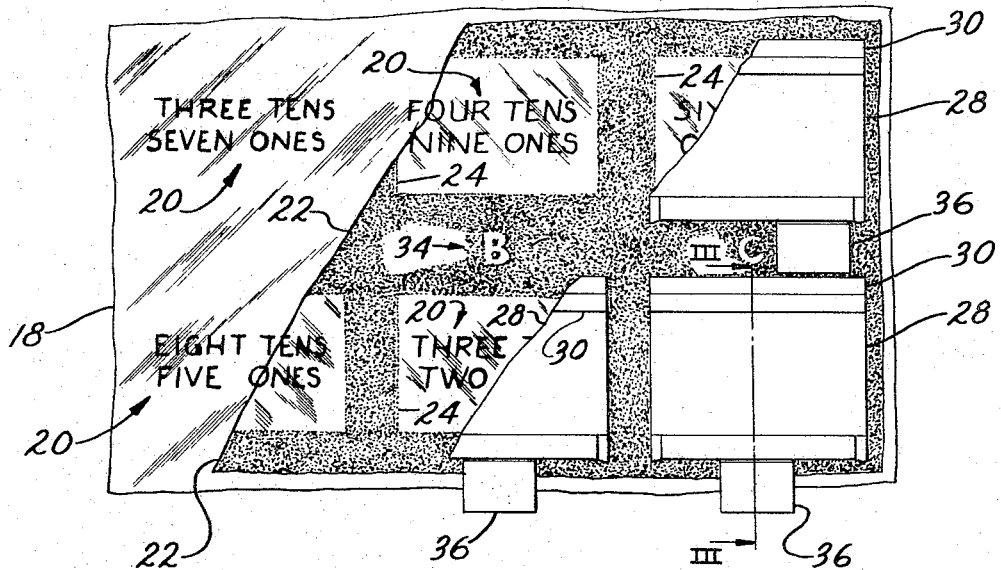
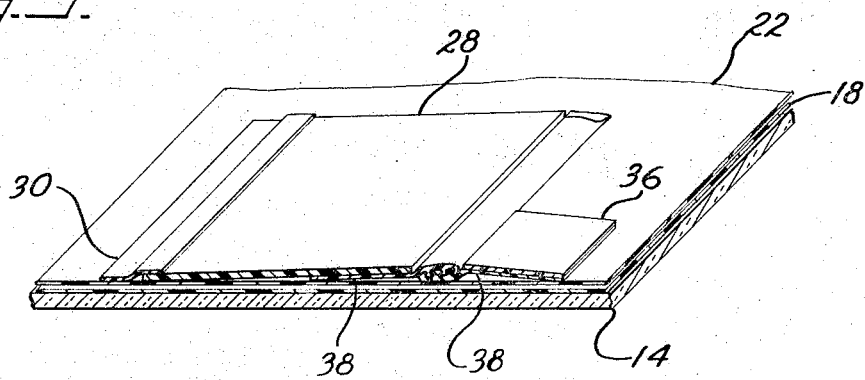
INVENTOR.
STANLEY E. SACKS
BY Chapin & Neal
Attorneys

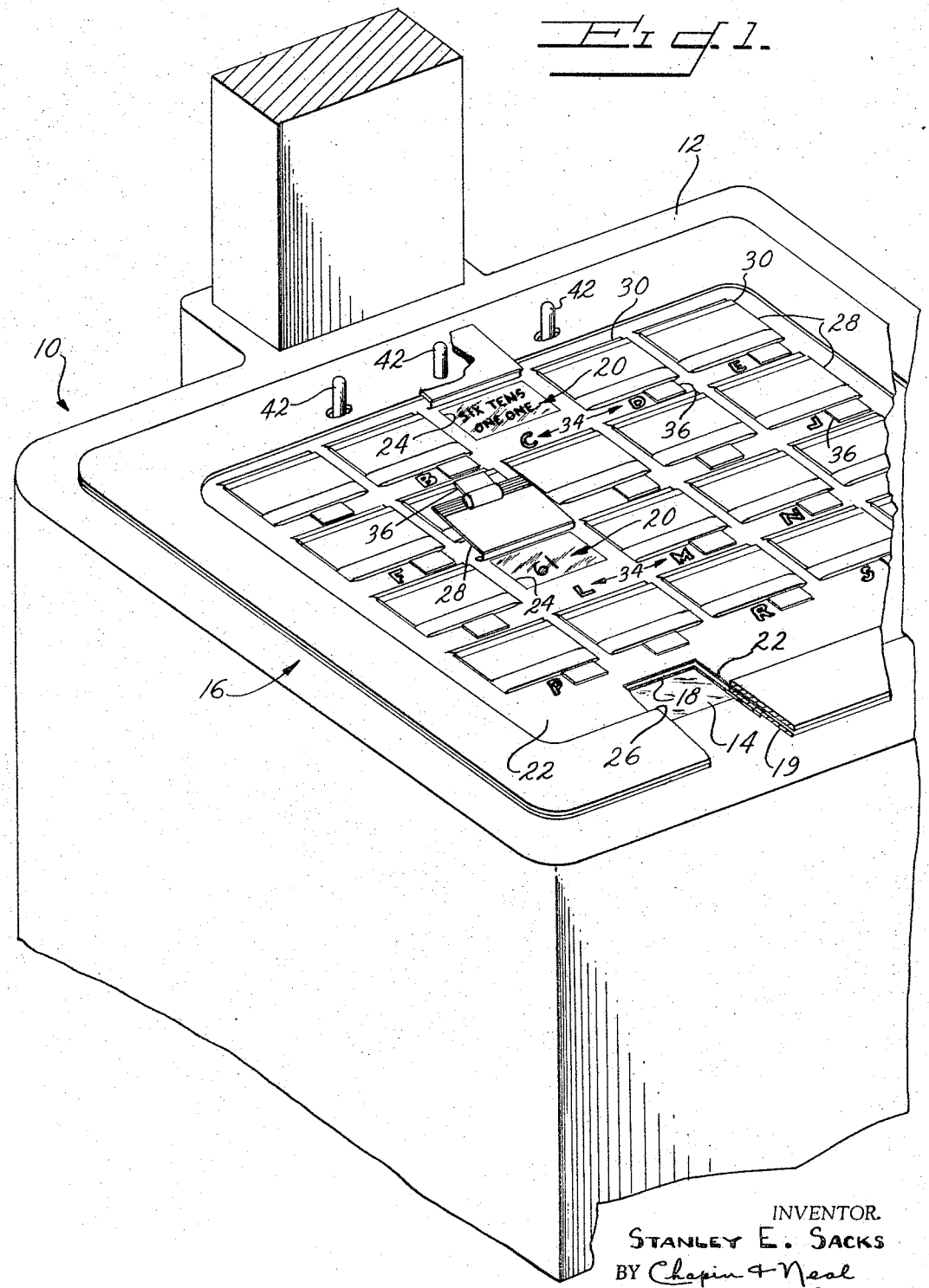

United States Patent Office 3,339,288
Patented Sept. 5, 1967

3,339,288
PROJECTION GAME DEVICE
Stanley E. Sacks, Plainview, N.Y., assignor to Tecnifax Corporation, Holyoke, Mass., a corporation of Massachusetts
Filed Dec. 21, 1964, Ser. No. 419,636
3 Claims. (Cl. 35—9)

The present invention relates to improvements in game devices.

The primary object of the invention is to facilitate the learning of various subjects through the stimulus of a projection game device which presents a challenge eliminating the tedium of conventional teaching programs usually based on rote memory.

Another and ancillary object is to provide such a game device for use with overhead projectors which may be employed to facilitate learning of various subjects through the further stimulus of visual perception and competition in playing the game.

In a broader sense, the object of the invention is to provide an improved game device for amusement, as well as for the purposes set forth above.

The present invention is characterized by the provision of a game device which is to be used in combination with an overhead projector of the type having a stage overlying a light source. In such projectors the image or indicia on a transparency which has been placed on the stage, is projected or displayed on a screen or the like which is readily visible to all members of a relatively large group, as the members of a school class. The game device broadly speaking, comprises a transparency having indicia including a plurality of associated pairs of indicia. A separate flap overlies each indicia and normally prevents the indicium therebeneath from being displayed by the projector. These flaps are each displaceable so that the indicia may be selectively displayed by the projector. In use, a student would attempt to displace two flaps which would display an associated pair of indicia on the transparency. The student may displace the flaps himself or may designate pairs of flaps by identifying indicia which are preferably provided. The teacher or monitor then displaces or uncovers the flaps to display two indicia on the screen. The meaning of "associated pairs of indicia" and the manner of using the game device will be described in greater detail below.

The above and other related objects and features of the invention will be apparent from a reading of the following description of the disclosure found in the accompanying drawings and the novelty thereof pointed out in the appended claims.

In the drawings:

FIG. 1 is a perspective view with portions thereof broken away and others in section, illustrating a device embodying the present invention as it is employed in combination with an overhead projector;

FIG. 2 is a fragmentary enlarged plan view of a portion of the device seen in FIG. 1, again with portions thereof broken away and in section;

FIG. 3 is a perspective view, on an enlarged scale, taken on section line III—III in FIG. 2.

As previously indicated, the present device is intended for use in combination with an overhead projector which is shown in fragmentary fashion in FIG. 1 and indicated generally by reference character 10. Such projectors conventionally comprise a horizontal stage 12 on which transparencies are placed. A light source therebeneath, indicated in the present instance by a glass plate 14, projects the image or indicia on the transparency upwardly to a reflector system, which then projects and usually enlarges the image as it is directed onto a screen or the like to be viewed from a considerable distance by a relatively large number of people. The use of overhead projectors of this type as classroom teaching aids is increasingly prevalent, and the present invention is intended to take advantage of this practice.

The present game device, indicated generally at 16, may be placed as a unit on the horizontal stage 12 of the overhead projector overlying the light source of glass plate 14. The game device 16 comprises a transparency 18 which is mounted in a frame 19. The transparency 18 has a plurality of indicia 20 (see also FIG. 2) thereon arranged in a given pattern, preferably in the form of a grid of aligned rows, there being five indicia in each of four rows in the illustrated embodiment.

Overlying the transparency 18 is a mask 22 having a pattern of windows 24 which are registered respectively with the indicia 20. In the illustrated embodiment and in accordance with a preferred feature of the invention, the mask 22 takes the form of a transparency which has been exposed to provide opaque portions (indicated by stippling in FIG. 2) defining the transparent windows 24. This transparency is mounted in a mask 26.

Each of the windows 24 is normally covered by a flap 28 which are sufficiently opaque to prevent display of said indicia and are selectively displaceable to permit display of the indicia 20 therebeneath on the screen used in combination with the projector. Preferably, the flaps 28 are each hingedly connected to the mask or transparency 22. Conveniently this hinge connection is provided by the use of strips of flexible material 30 adhered to the flap 28 and to the mask 22 by pressure sensitive cement. It is also preferable that the hinged connections for each of the flaps 28 be located at what would be considered the top of each window 24.

Each of the windows is provided with an identifying indicia 34; in the present instance the sequentially arranged letters of the alphabet are preferably provided as transparent portions of the transparency forming the mask 22. These identifying indicia are disposed at the bottom of each respective window. A tab 36 is disposed at the bottom edge of each of the flaps 28 and may be selectively positioned either in overlying relation to the identifying indicia 34 or to one side thereof. Preferably this connection between the tabs 36 and flaps 28 takes the form of a pair of strips 38 secured respectively to the flap 28 and tab 36, with the strips 38 having interdigitating grooves and ribs which permit longitudinal movement while holding the tabs 36 in assembled relation with the flaps 28.

Each indicium 20 on the transparency 18 may take the form of a single word, a group of words, a symbol or device. As previously indicated, these indicia 20 comprise associated pairs. These associated pairs may be identical indicia as might be used in a spelling exercise where it was desired to spell a word correctly and then find the other indentical word and either spell it again or repeat it correctly. An associated pair of indicia may take the form as illustrated in the drawing where numbers are indicated in their Arabic form, and then in their sub-division of 10's and 1's. Similarly, a pair of indicia might be the name of a State and the name of the capital of that State.

In any event, the object of the game is to uncover a pair of windows 24 which will display an associated pair of indicia on the projector screen. In use, a student may lift the flaps 28 himself or call out identifying indicia 34 which may be lifted by the teacher or monitor. In FIG. 1 it would be assumed that the student had called out the letters C and L and the flaps overlying the windows 24 identified thereby had been lifted, in which case the associated pairs of indicia, namely six 10's, one 1 and 61 would be displayed on the projector screen. Having successfully located an associated pair of indicia, the student would be entitled to continue in an attempt to locate a further pair of associated indicia 20. As an assist in playing the game, the tabs 36 may be displaced into overlying relation, with each of the identifying indicia 34 which have been found to identify an associated pair of indicia 20. This procedure is indicated in FIGS. 1 and 2 of the drawings. The position of the tabs 36 in FIG. 1 indicates that a game is partially completed.

It will be evident from the above description that various transparencies 18 would be used having different indicia for different subjects, or for different phases of the same subject. Thus, it is advantageous that the transparency 18 be readily removable, and another transparency substituted therefor in registered relation to the windows of mask 22. To this end the frames 19 and 26 are both provided with registration holes to receive pins 42 projecting from the stage 12. Thus both frames can be quickly lifted from the pins and a new indicia bearing transparency registered with the masking frame 22 ready for use on the projector stage.

It will be apparent that the present game device provides an effective stimulus or challenge to an individual student. Alternately, the spirit of competition may be entered into as one student challenges another, or groups of students challenge each other. In any event, the learning process has the feature of amusement which maintains the student's interest over a prolonged period. Furthermore, visual observation of the question or problem followed by the thought process as to the answer and thereafter the unmasking of a correct answer is considered an excellent learning technique, also used in programmed teaching methods.

Having thus described the invention, what is claimed as novel and desired to be secured by Letters Patent of the United States is:

1. For use in combination with an overhead projector having a stage overlying a light source, a game device to be placed on said stage, said device comprising a transparency having indicia arranged thereon in a grid pattern of a plurality of rows of a given number of indicia, said indicia comprising a plurality of associated pairs of indicia, a mask overlying said transparency, said mask comprising a transparency having opaque portions defining windows arranged in said grid pattern and registering respectively with said indicia and opaque flaps covering said windows, said flaps being hingedly connected by a flexible strip adhesively secured to said mask and said flaps, said flaps being swingable from said covering relation to permit said indicia to be displayed by said projector in an attempt to locate the windows registered with a pair of associated indicia, the transparency comprising said mask further having at the bottom of each window transparent identifying indicium to be displayed by said projector, each flap at the bottom edge thereof having a tab which may be selectively moved from a position to one side of the identifying indicium to a position overlying same to prevent its display by said projector.

2. For use in combination with an overhead projector having a stage overlying a light source, a game device to be placed on said stage, said device comprising a transparency mounted in a frame and having indicia arranged thereon in a grid pattern of a plurality of rows of a given number of indicia, said indicia comprising a plurality of associated pairs of indicia, a mask overlying said transparency, said mask comprising a transparency having opaque portions defining windows arranged in said grid pattern and registering respectively with said indicia, opaque flaps respectively covering said windows, each of said flaps being hingedly connected at the top of its respective window by a flexible strip adhesively secured to said mask and said flap, said flaps being swingable from said covering relation to permit the indicia therebeneath to be displayed by said projector in an attempt to locate the windows registering with a pair of associated indicia, the transparency comprising said mask further having at the bottom of each window transparent identifying indicium to be displayed by said projector, each flap at the bottom edge thereof having a tab which may be selectively moved from a position to one side of the identifying indicium to a position overlying same to prevent its display by said projector.

3. A game device as in claim 2 wherein the frames in which the two transparencies are mounted are readily separable for the substitution of alternate indicia bearing transparencies, and further wherein means are provided for registering the two transparencies so that the windows of the mask transparency are in registered relation with indicia of the underlying transparency.

References Cited

UNITED STATES PATENTS

| | | | |
|---|---|---|---|
| 2,291,173 | 7/1942 | Simpson | 40—158 |
| 2,357,593 | 9/1944 | Leavell | 35—35 |
| 2,802,284 | 8/1957 | Dreisonstok et al. | 35—9 |
| 3,116,564 | 1/1964 | Sanford et al. | 35—9 |

EUGENE R. CAPOZIO, *Primary Examiner.*

W. NIELSEN, S. M. BENDER, *Assistant Examiners.*